(12) United States Patent
Nemoto

(10) Patent No.: US 6,524,019 B1
(45) Date of Patent: Feb. 25, 2003

(54) INTER-CLUSTER DATA TRANSFER SYSTEM AND DATA TRANSFER METHOD

(75) Inventor: Ryoji Nemoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/622,397

(22) Filed: Mar. 27, 1996

(30) Foreign Application Priority Data

Mar. 27, 1995 (JP) .............................................. 7-094578

(51) Int. Cl.[7] .................................................. H04B 1/00
(52) U.S. Cl. ............................ 395/200.44; 395/200.43; 395/200.46; 395/200.61
(58) Field of Search ....................... 395/200.01, 200.02, 395/200.08, 200.12, 474, 200.32, 200.35, 200.43, 200.44, 200.46, 200.61

(56) References Cited

U.S. PATENT DOCUMENTS 4,855,903 A * 8/1989 Carleton et al. ........ 395/200.05
5,067,071 A * 11/1991 Schanin et al. ............. 395/293

OTHER PUBLICATIONS

Rodrigue, "A Case Study In The Application Of A Tightly Coupled Multiprocessor to Scientific Computations" *Parallel Computations*, pp. 314–329, (1982).

* cited by examiner

Primary Examiner—James P. Trammell
Assistant Examiner—Thomas Peeso
(74) Attorney, Agent, or Firm—Foley & Lardner

(57) ABSTRACT

In a hierarchical multiprocessor system in which a plurality of clusters, each of which is a multiprocessor wherein a plurality of processors share a memory, each of data collecting units 31 of master processors 10-1 and 20-1 in clusters 10 and 20, respectively, collects at regular. time intervals data to be transferred from its own cluster to the other cluster; transferable data generating units 32 generates combined transferable data by putting together the remaining data after the removal of duplicates from the collected data; transferable data transfer units 33 transfers the generated combined transferable data to the master processor in the destination cluster; transferable data receiving units 34 receives combined transferable data transferred from the master processor in another cluster; and transferable data distributing units 35 distributes the received combined transferable data to processors in its own cluster.

12 Claims, 4 Drawing Sheets

FIG. 3

Combined transferable data (A)

| Source processor 10 - 1 | Destination processor 20 - 2 | Data array A<br>Data array B<br>Data array C | Source processor 10 - 2 | Destination processor 20 - 2 | Data array D<br>Data array E<br>Data array F |

Combined transferable data (B)

| Source processor 20 - 1 | Destination processor 10 - 2 | Data array K<br>Data array L<br>Data array M | Source processor 20 - 3 | Destination processor 10 - 1 | Data array X<br>Data array Y<br>Data array Z |

FIG. 4

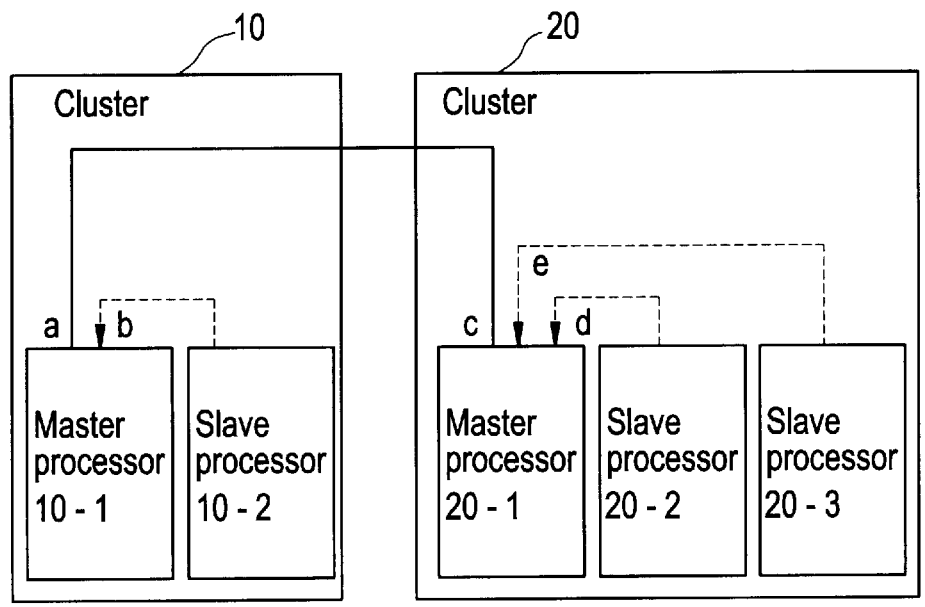

INTER-CLUSTER DATA TRANSFER SYSTEM AND DATA TRANSFER METHOD

BACKGROUND OF THE INVENTION

1. Field of the Invention

The present invention relates to a hierarchical multiprocessor system in which a plurality of clusters, each of which is a multiprocessor wherein a plurality of processors share a memory, and more particularly to an inter-cluster data transfer system and data transfer method for transferring, in these hierarchical multi-processors, data from a processor in one cluster to a processor in another cluster.

2. Description of the Related Art

In Garry Rodrigue, Parallel Computations, Academic Press, 1982, there is described a data transfer formula in a multiprocessor system in which a plurality of processors, each having a local distributed memory, are one-dimensionally combined.

This description of the prior art discloses no data transfer formula for a hierarchical multiprocessor system in which a plurality of clusters, wherein a plurality of processors share a memory, are combined.

According to this prior art, in transferring data, each processor individually designates another processor as destination of transfer.

Therefore, if this prior art is applied to a hierarchical multiprocessor system in which processors in the same cluster share a memory, data transfers from a plurality of processors in a cluster to processors in another cluster may result in repeated transfers of exactly the same data, inviting inefficiency of data transfers.

SUMMARY AND OBJECTS OF THE INVENTION

An object of the present invention is to make possible efficient execution of data transfers between clusters in a hierarchical multiprocessor system in which a plurality of clusters, each of which is a multiprocessor wherein a plurality of processors share a memory.

Another object of the invention is to prevent, where data are transferred between clusters in a hierarchical multiprocessor system, duplicated transfers of the same data and thereby minimize the number of data transfers between clusters.

A first inter-cluster data transfer system according to the invention, for use in a hierarchical multiprocessor system in which a plurality of clusters, each of which is a multiprocessor wherein a plurality of processors share a memory has the following configuration:

each of said clusters includes one master processor, and said master processor includes transferable data transfer means for transferring data, which are to be transferred from a processor in the cluster to which the master processor belongs to a processor in another cluster, to the master processor of that other cluster.

A second inter-cluster data transfer system according to the invention, for use in a hierarchical multiprocessor system in which a plurality of clusters, each of which is a multiprocessor wherein a plurality of processors share a memory, has the following configuration:

each of said clusters includes one master processor;

said master processor includes transferable data generating means and transferable data transfer means;

said transferable data generating means puts together data to be transferred from a processor in the cluster to which it belongs to a processor in another cluster; and said transferable data transfer means transfers the data put together by said data generating means to the master processor in the other cluster.

A third inter-cluster data transfer system according to the invention, for use in a hierarchical multiprocessor system in which a plurality of clusters, each of which is a multiprocessor wherein a plurality of processors share a memory, has the following configuration:

each of said clusters includes one master processor; said master processor includes data collecting means, transferable data generating means and transferable data transfer means;

said data collecting means collects data to be transferred from a processor in the cluster to which it belongs to a processor in another cluster;

said transferable data generating means puts together the data collected by said data collecting means to generate transferable data; and said transferable data transfer means transfers the transferable data generated by said data generating means to the master processor in the other cluster.

A fourth inter-cluster data transfer system according to the invention, for use in a hierarchical multiprocessor system in which a plurality of clusters, each of which is a multiprocessor wherein a plurality of processors share a memory, has the following configuration:

each of said clusters includes one master processor;

said master processor includes data collecting means, transferable data generating means, transferable data transfer means and transferable data receiving means;

said data collecting means collects data to be transferred from a processor in the cluster to which it belongs to a processor in another cluster;

said transferable data generating means puts together the data collected by said data collecting means to generate transferable data;

said transferable data transfer means transfers the transferable data generated by said data generating means to the master processor in the other cluster; and said transferable data receiving means receives the transferable data transferred from another cluster.

A fifth inter-cluster data transfer system according to the invention, for use in a hierarchical multiprocessor system in which a plurality of clusters, each of which is a multiprocessor wherein a plurality of processors share a memory, has the following configuration:

each of said clusters includes one master processor;

said master processor includes data collecting means, transferable data generating means, transferable data transfer means, transferable data receiving means, and transferable data distributing means;

said data collecting means collects data to be transferred from a processor in the cluster to which it belongs to a processor in another cluster;

said transferable data generating means puts together the data collected by said data collecting means to generate transferable data;

said transferable data transfer means transfers the transferable data generated by said data generating means to the master processor in the other cluster;

said transferable data receiving means receives the transferable data transferred from another cluster; and said transferable data distributing means distributes the transferable data received by said transferable data receiving means to the processors in the cluster to which it belongs.

A sixth inter-cluster data transfer system according to the invention further has the following configuration in the third inter-cluster data transfer system:

said transferable data generating means generates transferable data by putting together the remaining data after the removal of duplicates from the data collected by said data collecting means from a processor in the cluster to which it belongs.

A seventh inter-cluster data transfer system according to the invention further has the following configuration in the fourth inter-cluster data transfer system:

said transferable data generating means generates transferable data by putting together the remaining data after the removal of duplicates from the data collected by said data collecting means from a processor in the cluster to which it belongs.

An eighth inter-cluster data transfer system according to the invention further has the following configuration in the fifth inter-cluster data transfer system:

said transferable data generating means generates transferable data by putting together the remaining data after the removal of duplicates from the data collected by said data collecting means from a processor in the cluster to which it belongs.

A ninth inter-cluster data transfer system according to the invention further has the following configuration in the third inter-cluster data transfer system:

said data collecting means collects attribute information on the data to be transferred from a processor in the cluster to which it belongs to a processor in another cluster, said information including the initial address and size on the memory in which said data are stored; and said transferable data generating means generates transferable data by taking out from the memory the data corresponding to the remaining attribute information after the removal of duplicates from the attribute information on the data collected by said data collecting means, and putting together the taken-out data.

A tenth inter-cluster data transfer system according to the invention further has the following configuration in the fourth inter-cluster data transfer system:

said data collecting means collects attribute information on the data to be transferred from a processor in the cluster to which it belongs to a processor in another cluster, said information including the initial address and size on the memory in which said data are stored; and said transferable data generating means generates transferable data by taking out from the memory the data corresponding to the remaining attribute information after the removal of duplicates from the attribute information on the data collected by said data collecting means, and putting together the taken-out data.

An eleventh inter-cluster data transfer system according to the invention further has the following configuration in the fifth inter-cluster data transfer system:

said data collecting means collects attribute information on the data to be transferred from a processor in the cluster to which it belongs to a processor in another cluster, said information including the initial address and size on the memory in which said data are stored; and said transferable data generating means generates transferable data by taking out from the memory the data corresponding to the remaining attribute information after the removal of duplicates from the attribute information on the data collected by said data collecting means, and putting together the taken-out data.

A twelfth inter-cluster data transfer system according to the invention further has the following configuration in the third inter-cluster data transfer system:

said data collecting means collects at regular time intervals data to be transferred from a processor in the cluster to which it belongs to a processor in another cluster.

A thirteenth inter-cluster data transfer system according to the invention further has the following configuration in the fourth inter-cluster data transfer system:

said data collecting means collects at regular time intervals data to be transferred from a processor in the cluster to which it belongs to a processor in another cluster.

A fourteenth inter-couster data transfer system according to the invention further has the following configuration in the fifth inter-cluster data transfer system:

said data collecting means collects at regular time intervals data to be transferred from a processor in the cluster to which it belongs to a processor in another cluster.

A fifteenth inter-cluster data transfer system according to the invention further has the following configuration in the sixth inter-cluster data transfer system:

said data collecting means collects at regular time intervals data to be transferred from a processor in the cluster to which it belongs to a processor in another cluster.

A sixteenth inter-cluster data transfer system according to the invention further has the following configuration in the seventh inter-cluster data transfer system:

said data collecting means collects at regular time intervals data to be transferred from a processor in the cluster to which it belongs to a processor in another cluster.

A seventeenth inter-cluster data transfer system according to the invention further has the following configuration in the eighth inter-cluster data transfer system:

said data collecting means collects at regular time intervals data to be transferred from a processor in the cluster to which it belongs to a processor in another cluster.

An eighteenth inter-cluster data transfer system according to the invention further has the following configuration in the ninth inter-cluster data transfer system:

said data collecting means collects at regular time intervals data to be transferred from a processor in the cluster to which it belongs to a processor in another cluster.

A nineteenth inter-cluster data transfer system according to the invention further has the following configuration in the tenth inter-cluster data transfer system:

said data collecting means collects at regular time intervals data to be transferred from a processor in the cluster to which it belongs to a processor in another cluster.

A twentieth inter-cluster data transfer system according to the invention further has the following configuration in the eleventh inter-cluster data transfer system:

said data collecting means collects at regular time intervals data to be transferred from a processor in the cluster to which it belongs to a processor in another cluster.

A first inter-cluster data transfer method according to the invention, for use in a hierarchical multiprocessor system in which a plurality of clusters, each of which is a multiprocessor wherein a plurality of processors share a memory, includes the following procedures:

one master processor included in each of said clusters transfers data, which are to be transferred from a processor in the cluster to which the master processor belongs to a processor in another cluster, to the master processor of that other cluster.

A second inter-cluster data transfer method according to the invention, for use in a hierarchical multiprocessor system in which a plurality of clusters, each of which is a multiprocessor wherein a plurality of processors share a memory, includes the following procedures:

one master processor included in each of said clusters puts together data, which are to be transferred from a processor in the cluster to which the master processor belongs to a processor in another cluster, and transfers them to the master processor of that other cluster.

A third inter-cluster data transfer method according to the invention, for use in a hierarchical multiprocessor system in which a plurality of clusters, each of which is a multiprocessor wherein a plurality of processors share a memory, includes the following procedures:

one master processor included in each of said clusters collects data, which are to be transferred from a processor in the cluster to which the master processor belongs to a processor in another cluster, puts together the collected data to generate transferable data, and transfers the generated transferable data to the master processor of that other cluster.

A fourth inter-cluster data transfer method according to the invention, for use in a hierarchical multiprocessor system in which a plurality of clusters, each of which is a multiprocessor wherein a plurality of processors share a memory, includes the following procedures:

one master processor included in each of said clusters collects data, which are to be transferred from a processor in the cluster to which the master processor belongs to a processor in another cluster, puts together the collected data to generate transferable data, transfers the generated transferable data to the master processor of that other cluster, and at the same time receives transferable data transferred from another cluster.

A fifth inter-cluster data transfer method according to the invention, for use in a hierarchical multiprocessor system in which a plurality of clusters, each of which is a multiprocessor wherein a plurality of processors share a memory, includes the following procedures:

one master processor included in each of said clusters collects data, which are to be transferred from a processor in the cluster to which the master processor belongs to a processor in another cluster, puts together the collected data to generate transferable data, transfers the generated transferable data to the master processor of that other cluster, at the same time receives transferable data transferred from another cluster, and distributes the received transferable data to the processors in the cluster to which it belongs.

A sixth inter-cluster data transfer method according to the invention further includes the following procedure in the third inter-cluster data transfer method:

said master processor, in generating transferable data, generates transferable data by putting together the remaining data after the removal of duplicates from the data collected from a processor in the cluster to which it belongs.

A seventh inter-cluster data transfer method according to the invention further includes the following procedure in the fourth inter-cluster data transfer method:

said master processor, in generating transferable data, generates transferable data by putting together the remaining data after the removal of duplicates from the data collected from a processor in the cluster to which it belongs.

An eighth inter-cluster data transfer method according to the invention further includes the following procedure in the fifth inter-cluster data transfer method:

said master processor, in generating transferable data, generates transferable data by putting together the remaining data after the removal of duplicates from the data collected from a processor in the cluster to which it belongs.

A ninth inter-cluster data transfer method according to the invention further includes the following procedure in the third inter-cluster data transfer method:

said master processor, in collecting data, collects attribute information on the data to be transferred from a processor in the cluster to which it belongs to a processor in another cluster, said information including the initial address and size on the memory in which said data are stored; and at the same time, in generating transferable data; generates transferable data by taking out from the memory the data corresponding to the remaining attribute information after the removal of duplicates from the attribute information on the collected data and putting together the taken-out data.

A tenth inter-cluster data transfer method according to the invention further includes the following procedure in the fourth inter-couster data transfer method:

said master processor, in collecting data, collects attribute information on the data to be transferred from a processor in the cluster to which it belongs to a processor in another cluster, said information including the initial address and size on the memory in which said data are stored; and at the same time, in generating transferable data, generates transferable data by taking out from the memory the data corresponding to the remaining attribute information after the removal of duplicates from the attribute information on the data collected by said data collecting means, and putting together the taken-out data.

An eleventh inter-cluster data transfer method according to the invention further includes the following procedure in the fifth inter-cluster data transfer method:

said master processor, in collecting data, collects attribute information on the data to be transferred from a processor in the cluster to which it belongs to a processor in another cluster, said information including the initial address and size on the memory in which said data are stored; and at the same time, in generating transferable data, generates transferable data by taking out from the memory the data corresponding to the remaining attribute information after the removal of duplicates from the attribute information on the data collected by said data collecting means, and putting together the taken-out data.

A twelfth inter-cluster data transfer method according to the invention further includes the following procedure in the third inter-cluster data transfer method:

said master processor, in collecting data, collects at regular time intervals data to be transferred from a processor in the cluster to which it belongs to a processor in another cluster.

A thirteenth inter-cluster data transfer method according to the invention further includes the following procedure in the fourth inter-cluster data transfer method:

said master processor, in collecting data, collects at regular time intervals data to be transferred from a processor in the cluster to which it belongs to a processor in another cluster.

A fourteenth inter-cluster data transfer method according to the invention further includes the following procedure in the fifth inter-cluster data transfer method:

said master processor, in collecting data, collects at regular time intervals data to be transferred from a processor in the cluster to which it belongs to a processor in another cluster.

A fifteenth inter-cluster data transfer method according to the invention further includes the following procedure in the sixth inter-cluster data transfer method:

said master processor, in collecting data, collects at regular time intervals data to be transferred from a processor in the cluster to which it belongs to a processor in another cluster.

A sixteenth inter-cluster data transfer method according to the invention further includes the following procedure in the seventh inter-cluster data transfer method:

said master processor, in collecting data, collects at regular time intervals data to be transferred from a processor in the cluster to which it belongs to a processor in another cluster.

A seventeenth inter-cluster data transfer method according to the invention further includes the following procedure in the eighth inter-cluster data transfer method:

said master processor, in collecting data, collects at regular time intervals data to be transferred from a processor in the cluster to which it belongs to a processor in another cluster.

An eighteenth inter-cluster data transfer method according to the invention further includes the following procedure in the ninth inter-cluster data transfer method:

said master processor, in collecting data, collects at regular time intervals data to be transferred from a processor in the cluster to which it belongs to a processor in another cluster.

A nineteenth inter-cluster data transfer method according to the invention further includes the following procedure in the tenth inter-cluster data transfer method:

said master processor, in collecting data, collects at regular time intervals data to be transferred from a processor in the cluster to which it belongs to a processor in another cluster.

A twentieth inter-cluster data transfer method according to the invention further includes the following procedure in the eleventh inter-cluster data transfer method:

said master processor, in collecting data, collects at regular time intervals data to be transferred from a processor in the cluster to which it belongs to a processor in another cluster.

BRIEF DESCRIPTION OF THE DRAWINGS

The invention will be understood more fully from the detailed description given here and from the accompanying drawings of a preferred embodiment thereof, which, however, should not be considered as limiting the invention but are merely for explanation and facilitation of understanding.

FIG. 3 illustrates the composition of combined transferable data generated by the master processor of each cluster in the embodiment of the invention.

FIG. 4 illustrates the process in which a master processor collects transferable data from another slave processor or other processors in the embodiment of the invention.

Here, it should be noted that like reference numerals represent like elements throughout the disclosure.

DETAILED DESCRIPTION OF THE PREFERRED EMBODIMENT

A preferred embodiment of the present invention will be described in detail below with reference to the drawings.

Figures 1, 2:
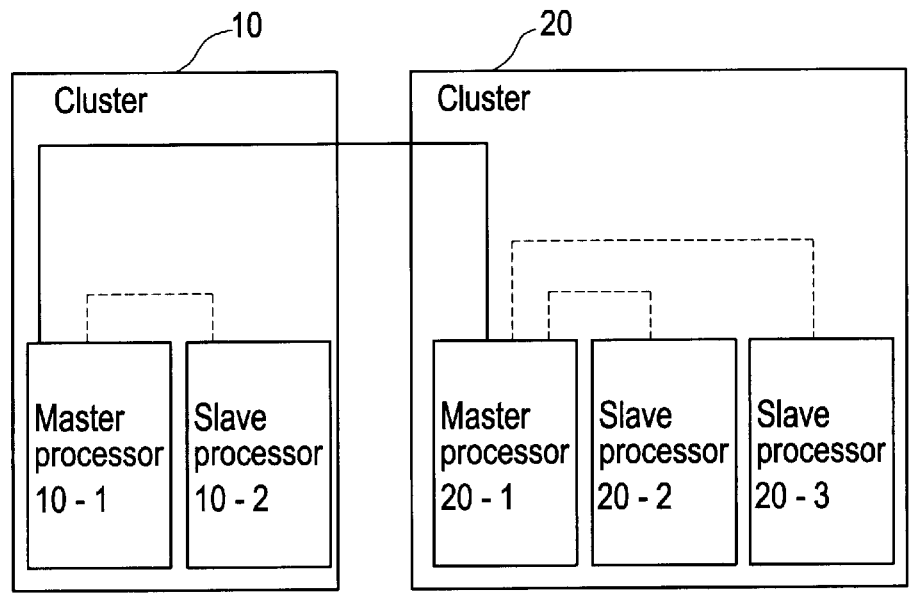
FIG. 1 is a block diagram of a preferred embodiment of the invention.
FIG. 2 illustrates the composition of transferable data to be transferred from each source processor to each destination processor in the embodiment of the invention.

Referring to FIG. 1, an inter-cluster data transfer system, which is an embodiment of the invention, consists of clusters 10 and 20; the cluster 10 comprises a master processor 10-1 and a slave processor 10-2 which share a memory in the cluster 10, and the cluster 20 comprises a master processor 20-1 and slave processors 20-2 and 20-3 which share a memory in the cluster 20. None of the processors in the the cluster 10 share any memory with none of the processors in the cluster 20.

Each of the master processors 10-1 and 20-1 in the clusters 10 and 20, respectively, comprises data collecting means 31 for collecting at regular time intervals data to be transferred from its own cluster to the other cluster; transferable data generating means 32 for putting together the data collected by the data collecting means 31 to generate combined transferable data; transferable data transfer means 33 for transferring the combined transferable data generated by the transferable data generating means 32 to the master processor in the destination cluster; transferable data receiving means 34 for receiving combined transferable data transferred from the master processor in the other cluster; and transferable data distributing means 35 for distributing the combined transferable data received by the transferable data receiving means 34 to processors in its own cluster.

The operation of the inter-cluster data transfer system, which is a preferred embodiment of the invention, will be described below with reference to FIGS. 1 through 7.

First, the processing to transfer the transferable data shown in FIG. 2 from one cluster to the other cluster will be described with reference to FIGS. 3 through 7.

Figure 5:
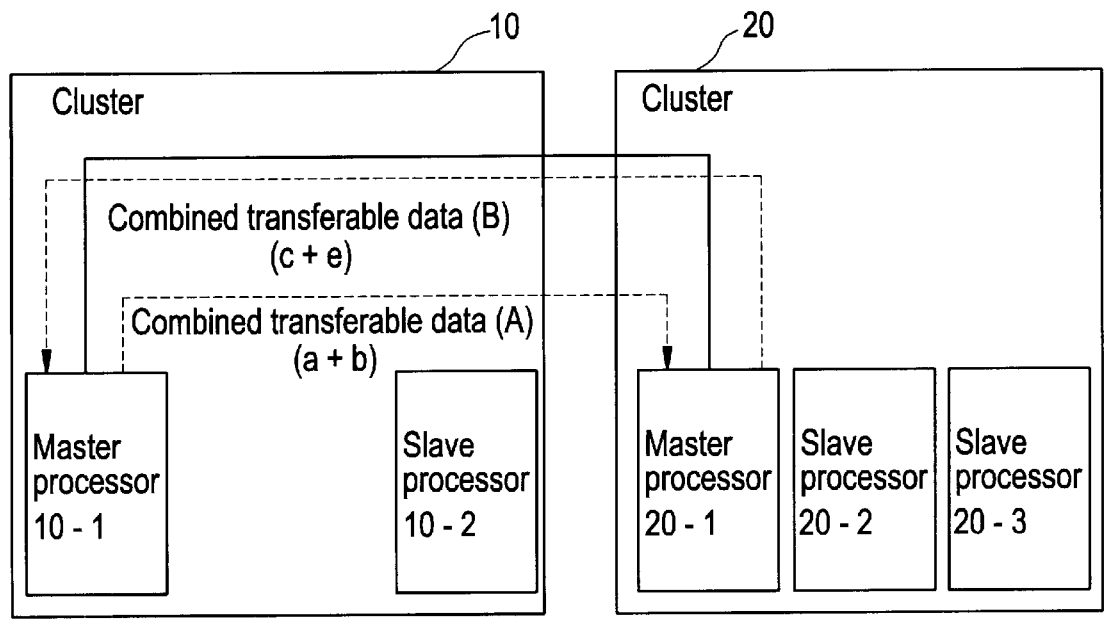
FIG. 5 illustrates the process in which a master processor transfers combined transferable data to the master processor of another cluster in the embodiment of the invention.
Figure 6:
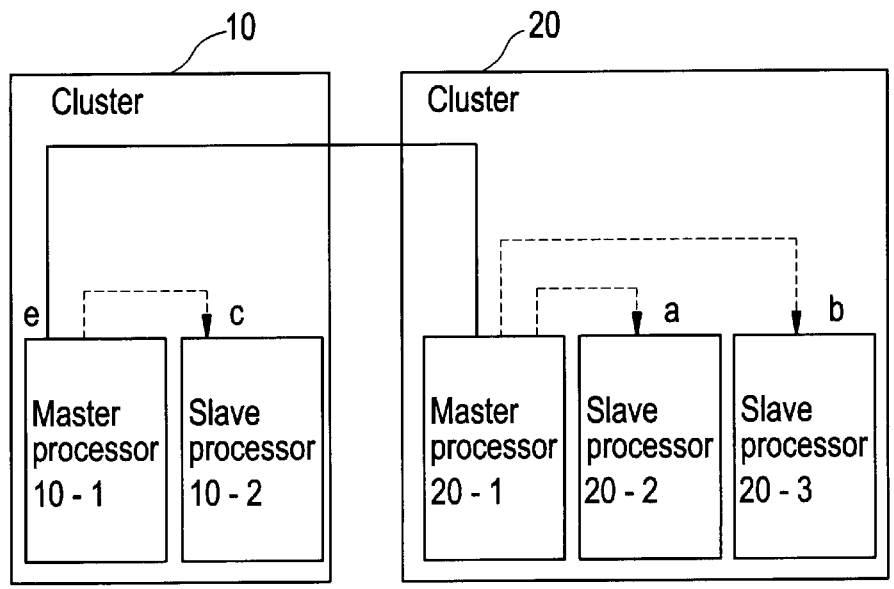
FIG. 6 illustrates the process in which a master processor distributes combined transferable data it has received in the embodiment of the invention.
Figure 7:
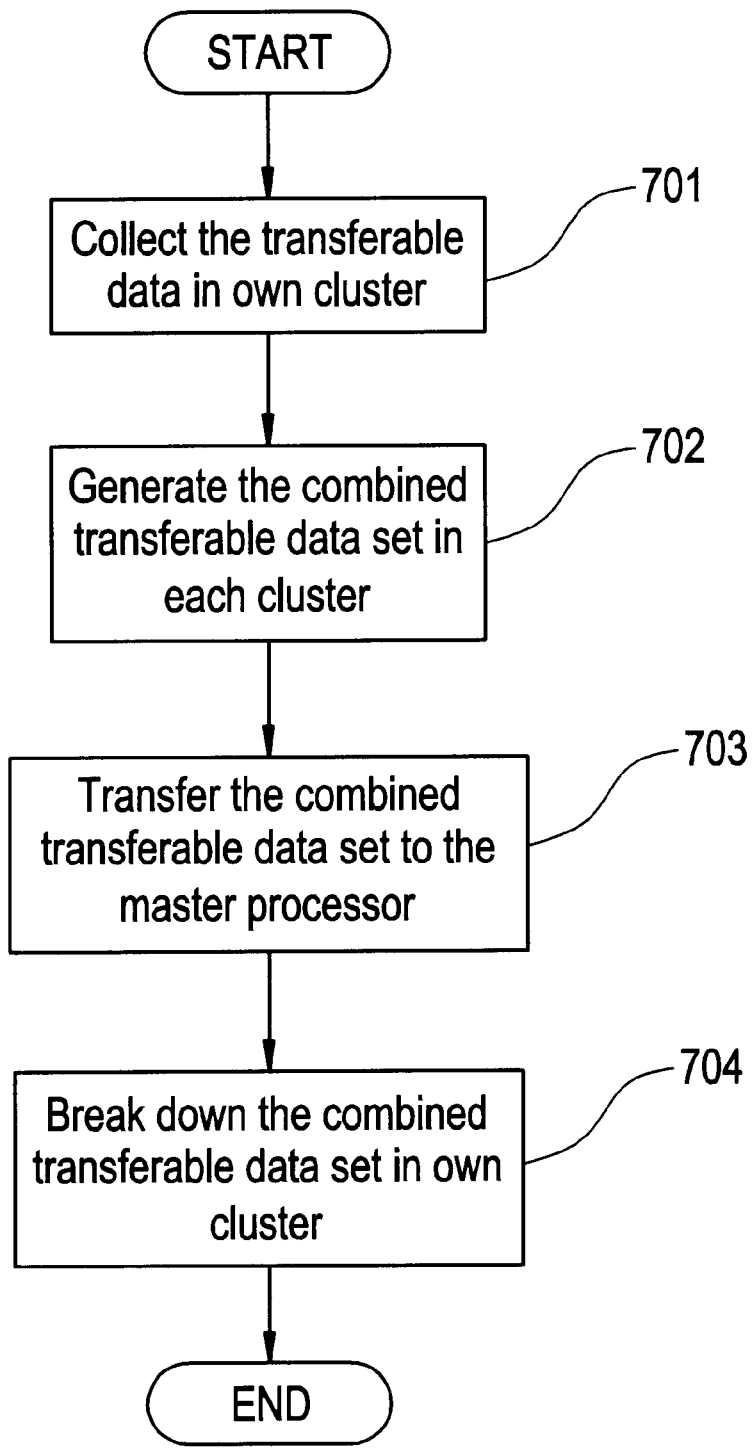
FIG. 7 is a flow chart illustrating the processing from the data collecting means 31 to the transferable data generating means 32, transferable data transfer means 33 and transferable data distributing means 35 of the master processor 10-1 and master processor 20-1 in the embodiment of the invention.

FIG. 3 shows typical compositions of combined transferable data, and FIGS. 4 through 6 are block diagrams illustrating how the transfers are processed.

Each of the transferable data sets a through e in FIG. 2 consists of data designating the source processor, data designating the destination processor and data arrays to be transferred. For instance, the transferable data set a includes data arrays A through C to be transferred from the master processor 10-1 of the cluster 10 to the slave processor 20-2 of the cluster 20; the transferable data set d includes data arrays K through M to be transferred from the slave processor 20-2 of the cluster 20 to the slave processor 10-2 of the cluster 10.

It is seen that, out of the transferable data sets a through e shown in FIG. 2, the transferable data set c to be transferred from the master processor 20-1 of the cluster 20 to the slave processor 10-2 of the cluster 10 is the same as the transferable data set d to be transferred from the slave processor 20-2 of the cluster 20 to the slave processor 10-2 of the cluster 10.

In transferring any of the transferable data sets a through 3 shown in FIG. 2, as illustrated in FIG. 4, each of the data collecting means of the master processors 10-1 and 20-1 of the clusters 10 and 20, respectively, first collects at regular time intervals data to be transferred from processors in its own cluster to processors in the other cluster (step 701). In FIG. 4, the broken arrows represent the flows of transferable data. Here, no inter-cluster data transfer takes place.

When the data collecting means 31 of the master processor 10-1 in the cluster 10 has collected the transferable data set b from the slave processor 10-2, the transfer data generating means 32 of the master processor 10-1 puts together the transferable data set a from the master processor 10-1 itself and the transferable data set b delivered from the slave processor 10-2, and thereby generates the combined transferable data set (A) shown in FIG. 3 (step 702).

Similarly id the cluster 20, the data collecting means of the master processor 20-1 collects the transferable data set d from the slave processor 20-2 and the transferable data set e from the slave processor 20-3, and the transfer data generating means 32 of the master processor 20-1 generates the combined transferable data set (B) shown in FIG. 3 by putting together the transferable data set c from the master processor 20-1 itself, the transferable data set d delivered from the slave processor 20-2 and the transferable data set e from the slave processor 20-3 (step 702).

The transfer data generating means 32 of the master processor 10-1, as the transferable data sets a and b differ from each other in contents, puts together the two sets of data as they are to generate the combined transferable data (A). The transferable data generating means 32 of the master processor 20-1, as the transferable data sets c and d, out of the transferable data sets c, d and e, are the same as and duplicate each other, generates the combined transferable data set (B) shown in FIG. 3 by omitting the transferable data set d.

When the transferable data generating means 32 have generated combined transferable data sets, as shown in FIG. 5, the transferable data transfer means 33 of the master processor 10-1 in the cluster 10 transfers the combined transferable data set (A), which has been generated, to the master processor 20-1 of the cluster 20 (step 703). Similarly, the transferable data transfer means 33 of the master processor 20-1 in the cluster 20 transfers the combined transferable data set (B) to the master processor 10-1 of the cluster 10. Here, two inter-cluster data transfers take place.

When the transferable data receiving means 34 of the master processor 10-1 receives the combined transferable data set (B) from the master processor 20-1, the transferable data distributing means 35 of the master processor 10-1, as shown in FIG. 6, breaks down the combined transferable data set into the transferable data sets c and e (step 704). Thus the transferable data distributing means 35 of the master processor 10-1 receives the transferable data set e for itself, and delivers the transferable data set c to the slave processor 10-2.

Similarly, when the transfer data receiving means 34 of the master processor 20-1 receives the combined transferable data set (A) from the master processor 10-1, the transfer data distributing means 35 of the master processor 20-1, as illustrated in FIG. 6, breaks down the combined transferable data set into the transferable data sets a and b. Thus the transferable data distributing means 35 of the master processor 20-1 delivers the transferable data sets a and b to the slave processor 20-2. This completes the transfers of the transferable data sets shown in FIG. 2.

In the case of the system of FIG. 1, when the inter-cluster transferable data sets a through e as shown in FIG. 2 arise, because they are put together into the combined transferable data sets (A) and (B) and transferred in the combined state, the transfer of the transferable data d is dispensed with.

Incidentally, in the same cluster, since the processors share the memory in the cluster, there is no need to transfer transferable data themselves from any slave processor to the master processor in the cluster. In practice, only attribute information on the transferable data (such information as the initial address and the data size) is transferred. Thus, for the transferable data b of FIG. 2 for instance, only the attribute information on the data arrays D, E and F is transferred from the slave processor 10-2 to the master processor 10-1.

Thus is completed a round of processing by the inter-cluster data transfer system, which is an embodiment of the present invention.

Although the above-described preferred embodiment of the invention is a hierarchical multiprocessor system consisting of a cluster 10 comprising two processors and a cluster 20 comprising three processors, the invention is also applicable to hierarchical multiprocessor systems each consisting of three or more clusters. In a hierarchical multiprocessor system consisting of three or more clusters, if transferable data having different destinations arise from processors in a plurality of clusters, the multiprocessor will generate two or more combined transferable data sets for each destination cluster, and transfer them to the master processor of each cluster.

The inter-cluster data transfer system according to the invention, for use in a hierarchical multiprocessor system in which a plurality of clusters, each being a multiprocessor wherein a plurality of processors share a memory, are combined is characteristic in that each of the data collecting means 31 of the master processors 10-1 and 20-1 of the clusters 10 and 20, respectively, collects at regular time intervals data to be transferred from a processor in its own cluster to a processor in the other cluster; the transferable data generating means 32 generates combined transferable data by putting together the remaining data after the removal of duplicates from the collected data; the transferable data transfer means 33 transfers the combined transferable data that have been generated to the master processor in the destination cluster; the transferable data receiving means 34 receives the combined transferable data set transferred from the master processor of the other cluster; and the transferable data distributing means distributes the combined transferable-data set that have been received to processors in its own cluster.

This configuration enables the inter-cluster data transfer system according to the invention, when data are to be transferred between clusters in a hierarchical multiprocessor system in which a plurality of clusters, each being a multiprocessor wherein a plurality of processors share a memory, to prevent duplicated transfers of the same data and to minimize the number of inter-cluster data transfers, thereby providing the benefit of making possible efficient execution of inter-cluster data transfers.

Although the invention has been described hitherto in detail in connection with a preferred embodiment thereof, it will be appreciated by those skilled in the art that this embodiment has been provided solely for the purpose of illustration, and is in no way to be regarded as limiting the scope of the invention. Instead, various modifications and substitutions of equivalent techniques will be readily apparent to those skilled in the art upon reading this specification, and such modifications and substitutions are to be regarded as falling within the true scope and spirit of the following claims.

What is claimed is:

1. An inter-cluster data transfer system for use in a hierarchical multiprocessor system in which a plurality of clusters, each of which is a multiprocessor wherein a plurality of processors share a memory, comprising the following configuration:

each of said clusters includes one master processor;

said master processor includes data collecting means, transferable data generating means and transferable data transfer means;

said data collecting means collects data to be transferred from a processor in the cluster to which it belongs to a processor in another cluster;

said transferable data generating means puts together the data collected by said data collecting means to generate transferable data;

said transferable data transfer means transfers the transferable data generated by said data generating means to the master processor in the other cluster; and said transferable data generating means generates transferable data by putting together the remaining data after the removal of duplicates from the data collected by said data collecting means from a processor in the cluster to which it belongs.

2. An inter-cluster data transfer system for use in a hierarchical multiprocessor system in which a plurality of clusters, each of which is a multiprocessor wherein a plurality of processors share a memory, comprising the following configuration:

each of said clusters includes one master processor;

said master processor includes data collecting means, transferable data generating means, transferable data transfer means and transferable data receiving means;

said data collecting means collects data to be transferred from a processor in the cluster to which it belongs to a processor in another cluster;

said transferable data generating means puts together the data collected by said data collecting means to generate transferable data;

said transferable data transfer means transfers the transferable data generated by said data generating means to the master processor in the other cluster;

said transferable data receiving mean, receives the transferable data transferred from another cluster; and said transferable data generating means generates transferable data by putting together the remaining data after the removal of duplicates from the data collected by said data collecting means from a processor in the cluster to which it belongs.

3. An inter-cluster data transfer system for use in a hierarchical multiprocessor system in which a plurality of clusters, each of which is a multiprocessor wherein a plurality of processors share a memory, comprising the following configuration:

each of said clusters includes one master processor;

said master processor includes data collecting means, transferable data generating means transferable data transfer means, transferable data receiving means, and transferable data distributing means;

said data collecting means collects data to be transferred from a processor in the cluster to which it belongs to a processor in another cluster;

said transferable data generating means puts together the data collected by said data collecting means to generate transferable data;

said transferable data transfer means transfers the transferable data generated by said data generating means to the master processor in the other cluster;

said transferable data receiving means receives the transferable data transferred from another cluster;

said transferable data distributing means distributes the transferable data received by said transferable data receiving means to the processors in the cluster to which it belongs; and said transferable data generating means generates transferable data by putting together the remaining data after the removal of duplicates from the data collected by said data collecting means from a processor in the cluster to which it belongs.

4. An inter-cluster data transfer system for use in a hierarchical multiprocessor system in which a plurality of clusters, each of which is a multiprocessor wherein a plurality of processors share a memory, comprising the following configuration:

each of said clusters includes one master processor;

said master processor includes data collecting means, transferable data generating means and transferable data transfer means;

said data collecting means collects data to be transferred from a processor in the cluster to which it belongs to a processor in another cluster;

said transferable data generating means puts together the data collected by said data collecting means to generate transferable data;

said transferable data transfer means transfers the transferable data generated by said data generating means to the master processor in the other cluster;

said data collecting means collects attribute information on the data to be transferred from a processor in the cluster to which it belongs to a processor in another cluster, said information including the initial address and size on the memory in which said data are stored; and said transferable data generating means generates transferable data by taking out from the memory the data corresponding to the remaining attribute information after the removal of duplicates from the attribute information on the data collected by said data collecting means, and putting together the taken-out data.

5. An inter-cluster data transfer system for use in a hierarchical multiprocessor system in which a plurality of clusters, each of which is a multiprocessor wherein a plurality of processors share a memory, comprising the following configuration:

each of said clusters includes one master processor;

said master processor includes data collecting means, transferable data generating means, transferable data transfer means and transferable data receiving means;

said data collecting means collects data to be transferred from a processor in the cluster to which it belongs to a processor in another cluster;

said transferable data generating means puts together the data collected by said data collecting means to generate transferable data;

said transferable data transfer means transfers the transferable data generated by said data generating means to the master processor in the other cluster;

said transferable data receiving means, receives the transferable data transferred from another cluster;

said data collecting means collects attribute information on the data to be transferred from a processor in the cluster to which it belongs to a processor in another cluster, said information including the initial address and size on the memory in which said data are stored; and said transferable data generating means generates transferable data by taking out from the memory the data corresponding to the remaining attribute information after the removal of duplicates from the attribute information on the data collected by said data collecting means, and putting together the taken-out data.

6. An inter-cluster data transfer system for use in a hierarchical multiprocessor system in which a plurality of clusters, each of which is a multiprocessor wherein a plurality of processors share a memory, comprising the following configuration:

each of said clusters includes one master processor;

said master processor includes data collecting means, transferable data generating means, transferable data transfer means, transferable data receiving means, and transferable data distributing means;

said data collecting means collects data to be transferred from a processor in the cluster to which it belongs to a processor in another cluster:

said transferable data generating means puts together the data collected by said data collecting means to generate transferable data;

said transferable data transfer means transfers the transferable data generated by said data generating means to the master processor in the other cluster;

said transferable data receiving means receives the transferable data transferred from another cluster;

said transferable data distributing means distributes the transferable data received by said transferable data receiving means to the processors in the cluster to which it belongs;

said data collecting means collects attribute information on the data to be transferred from a processor in the cluster to which it belongs to a processor in another cluster, said information including the initial address and size on the memory in which said data are stored; and said transferable data generating means generates transferable data by taking out from the memory the data corresponding to the remaining attribute information after the removal of duplicates from the attribute information on the data collected by said data collecting means, and putting together the taken-out data.

7. An inter-cluster data transfer method for use in a hierarchical multiprocessor system in which a plurality of clusters, each of which is a multiprocessor wherein a plurality of processors share a memory, comprising the following procedures:

one master processor included in each of said clusters collects data, which are to be transferred from a processor in the cluster to which the master processor belongs to a processor in another cluster, puts together the collected data to generate transferable data, and transfers the generated transferable data to the master processor of that other cluster:

said master processor, in generating transferable data, generates transferable data by putting together the remaining data after the removal of duplicates from the data collected from a processor in the cluster to which it belongs.

8. An inter-cluster data transfer method for use in a hierarchical multiprocessor system in which a plurality of clusters, each of which is a multiprocessor wherein a plurality of processors share a memory, comprising the following procedures:

one master processor included in each of said clusters collects data, which are to be transferred from a processor in the cluster to which the master processor belongs to a processor in another cluster, puts together the collected data to generate transferable data, transfers the generated transferable data to the master processor of that other cluster, and at the same time receives transferable data transferred from another cluster;

said master processor, in generating transferable data, generates transferable data by putting together the remaining data, after the removal of duplicates from the data collected from a processor in the cluster to which it belongs.

9. An inter-cluster data transfer method for use in a hierarchical multiprocessor system in which a plurality of clusters, each of which is a multiprocessor wherein a plurality of processors share a memory, comprising the following procedures:

one master processor included in each of said clusters collects data, which are to be transferred from a processor in the cluster to which the master processor belongs to a processor in another cluster puts together the collected data to generate transferable data, transfers the generated transferable data to the master processor of that other cluster, at the same time receives transferable data transferred from another cluster, and distributes the received transferable data to the processors in the cluster to which it belongs;

said master processor, in generating transferable data, generates transferable data by putting together the remaining data after the removal of duplicates from the data collected from a processor in the cluster to which it belongs.

10. An inter-cluster data transfer method for use in a hierarchical multiprocessor system in which a plurality of clusters, each of which is a multiprocessor wherein a plurality of processors share a memory, comprising the following procedures:

one master processor included in each of said clusters collects data, which are to be transferred from a processor in the cluster to which the master processor belongs to a processor in another cluster, puts together the collected data to generate transferable data, and transfers the generated transferable data to the master processor of that other cluster;

said master processor, in collecting data, collects attribute information on the data to be transferred from a processor in the cluster to which it belongs to a processor in another cluster, said information including the initial address and size on the memory in which said data are stored; and at the same time, in generating transferable data, generates transferable data by taking out from the memory the data corresponding to the remaining attribute information after the removal of duplicates from the attribute information on the collected data and putting together the taken-out data.

11. An inter-cluster data transfer method for use in a hierarchical multiprocessor system in which a plurality of clusters, each of which is a multiprocessor wherein a plurality of processors share a memory, comprising the following procedures:

one master processor included in each of said clusters collects data, which are to be transferred from a processor in the cluster to which the master processor belongs to a processor in another cluster, puts together the collected data to generate transferable data, transfers the generated transferable data to the master processor of that other cluster, and at the same time receives transferable data transferred from another cluster;

said master processor, in collecting data, collects attribute information on the data to be transferred from a processor in the cluster to which it belongs to a processor in another cluster, said information including the initial address and size on the memory in which said data are stored; and at the same time, in generating transferable data, generates transferable data by taking out from the memory the data corresponding to the remaining attribute information after the removal of duplicates from the attribute information on the data collected by said data collecting means, and putting together the taken-out data.

12. An inter-cluster data transfer method for use in a hierarchical multiprocessor system in which a plurality of clusters, each of which is a multiprocessor wherein a plurality of processors share a memory, comprising the following procedures:

one master processor included in each of said clusters collects data, which are to be transferred from a processor in the cluster to which the master processor belongs to a processor in another cluster, puts together the collected data to generate transferable data, transfers the generated transferable data to the master processor of that other cluster, at the same time receives transferable data transferred from another cluster, and distributes the received transferable data to the processors in the cluster to which it belongs;

said master processor, in collecting data, collects attribute information on the data to be transferred from a processor in the cluster to which it belongs to a processor in another cluster, said information including the initial address and size on the memory in which said data are stored; and at the same time, in generating transferable data, generates transferable data by taking out from the memory the data corresponding to the remaining attribute information after the removal of duplicates from the attribute information on the data collected by said data collecting means, and putting together the taken-out data.

* * * * *